United States Patent
Fan et al.

(10) Patent No.: US 11,668,628 B2
(45) Date of Patent: Jun. 6, 2023

(54) RETRACTION DEVICE AND FEED MECHANISM HAVING THE SAME

(71) Applicant: Leica Microsystems Ltd., Shanghai, Shanghai (CN)

(72) Inventors: Zheguang Fan, Shanghai (CN); Xiang Liang, Shanghai (CN); Gang Zhou, Shanghai (CN)

(73) Assignee: Leica Microsystems Ltd., Shanghai, Shanghai (CN)

( * ) Notice: Subject to any disclaimer, the term of this patent is extended or adjusted under 35 U.S.C. 154(b) by 159 days.

(21) Appl. No.: 16/765,510

(22) PCT Filed: Nov. 27, 2018

(86) PCT No.: PCT/CN2018/117725
§ 371 (c)(1),
(2) Date: May 20, 2020

(87) PCT Pub. No.: WO2019/105347
PCT Pub. Date: Jun. 6, 2019

(65) Prior Publication Data
US 2020/0307012 A1 Oct. 1, 2020

(30) Foreign Application Priority Data
Nov. 30, 2017 (CN) .......................... 201711236702.X

(51) Int. Cl.
*G01N 1/06* (2006.01)
*B26D 7/06* (2006.01)

(52) U.S. Cl.
CPC .................. *G01N 1/06* (2013.01); *B26D 7/06* (2013.01); *G01N 2001/065* (2013.01)

(58) Field of Classification Search
CPC .......... B26D 7/06; B26D 7/0616; G01N 1/06; G01N 2001/065; Y10S 83/9155
See application file for complete search history.

(56) References Cited

U.S. PATENT DOCUMENTS

| 4,625,608 A | 12/1986 | Behme et al. |
| 2017/0115189 A1 | 4/2017 | Heid |

FOREIGN PATENT DOCUMENTS

| CN | 201069416 Y | 6/2008 |
| CN | 106239574 A | 12/2016 |

*Primary Examiner* — Phong H Nguyen
(74) *Attorney, Agent, or Firm* — Hodgson Russ LLP

(57) ABSTRACT

A retraction device includes a spindle movable along the axis thereof and an operating unit including a pull rod and a movable member. The movable member defines a step-shaped groove, the pull rod has a first end connected to the spindle, and a second end received in the groove; the groove includes a first step and a second step and an inclined face connecting the first step and the second step arranged along a first direction, and a height of the second step is greater than that of the first step along the axis direction of the spindle; the movable member is slidable along the first direction relative to the pull rod, to allow the spindle to switch between a retraction position in which the pull rod is received in the second step, and a release position in which the pull rod is received in the first step.

20 Claims, 3 Drawing Sheets

RETRACTION DEVICE AND FEED MECHANISM HAVING THE SAME

CROSS-REFERENCE TO RELATED APPLICATIONS

The present application is a national phase entry under 35 USC § 371 of International Application PCT/CN2018/117725, filed Nov. 27, 2018, which claims the benefit of and priority to Chinese Patent Application No. 201711236702.X, filed Nov. 30, 2017, the entire disclosure of which is incorporated herein by reference.

FIELD

The present disclosure relates to a technical field of microtomes, and more particularly to a retraction device and a feeding mechanism having the same.

BACKGROUND

In a rotary microtome of the related art, the rotary microtome usually includes an object carriage for carrying a specimen holder which holds a specimen to be cut. The object carriage moves up and down in a vertical path of the rotary microtome. During the vertical movement, the specimen passes through a cutter fixedly arranged on the rotary microtome from an upper position to complete one section. After one section, the specimen holder is located under the cutter.

When the specimen is moved back to the upper position, its surface will hit the cutter and the specimen may be damaged. Therefore, a micro feeding mechanism for the rotary microtome has a retraction device. The function is realized by a pair of spring washers and a pull rod. When retraction is needed, the pull rod is pulled to pull the feeding mechanism back, and when the retraction is not needed, the pull rod is released, such that the feeding mechanism is moved to an original position by the pair of spring washers. The micro feeding mechanism in the related art refers to that the micro feeding mechanism can drive the specimen to feed 0.1 μm to 100 μm by turning a handwheel one circle.

A movable step realizes a switch between pulling back and releasing of the pull rod by abutting against the pull rod at either a high point or a low point of the movable step. When the retraction is needed, the high point of the movable step abuts against the pull rod such that the pull rod pulls the feeding mechanism back, and when the retraction is not needed, the low point of the movable step abuts against the pull rod such that the pull rod is moved to its original position. The movable step switches the pull rod between the high point and the low point of the movable step by hitting an upper end piece and a lower end piece.

Due to a large step height between the high point and the low point of the movable step, a surface connecting the high point and the low point is too steep and the end pieces are too hard, a current retraction device has a large noise during operation.

SUMMARY

A retraction device for a feeding mechanism of a microtome according to embodiments of the present disclosure includes: a spindle movable along an axis direction thereof and having a first end; and an operating unit including a pull rod and a movable member. The pull rod has a first end and a second end, and the movable member defines a step-shaped groove. The first end of the pull rod is connected to the first end of the spindle, and the second end of the pull rod is received in the groove. The groove includes a first step, a second step and an inclined face connecting the first step and the second step arranged along a first direction, and a height of the second step is greater than a height of the first step in the axis direction of the spindle. The movable member is slidable relative to the pull rod in the first direction, such that the pull rod is switchable between the first step and the second step through the inclined face, and thus the spindle is switchable between a retraction position and a release position. When in the retraction position, the pull rod is received in the second step, and when in the release position, the pull rod is received in the first step.

A retraction device for a feeding mechanism of a microtome according to embodiments of the present disclosure includes a spindle and an operate unit. The spindle is movable along an axis direction thereof, and the operating unit includes a movable member and a pull rod. The movable member defines a step-shaped groove, the groove includes a first step, a second step arranged along a first direction and an inclined face connecting the first step and the second step along the first direction, and the second step has a depth deeper than a depth of the first step in the axis direction of the spindle. The pull rod has a first end connected to the spindle and a second end received in the groove. The first direction is perpendicular to the axis direction of the spindle, the pull rod is slidable between the first step and the second step through the inclined face to cause the spindle to switch between a retraction position in which the pull rod is received in the second step, and a release position in which the pull rod is received in the first step.

A feeding mechanism according to embodiments of the present disclosure includes: an object carriage, a first slide base, a second slide base and a retraction device. The retraction device includes: a spindle movable along an axis direction thereof and having a first end; and an operating unit including a pull rod and a movable member. The pull rod has a first end and a second end, and the movable member defines a step-shaped groove. The first end of the pull rod is connected to the first end of the spindle, and the second end of the pull rod is received in the groove. The groove includes a first step, a second step and an inclined face connecting the first step and the second step arranged along a first direction, and a height of the second step is greater than a height of the first step in the axis direction of the spindle. The movable member is slidable relative to the pull rod in the first direction, such that the pull rod is switchable between the first step and the second step through the inclined face, and thus the spindle is switchable between a retraction position and a release position. When in the retraction position, the pull rod is received in the second step, and when in the release position, the pull rod is received in the first step. The object carriage is slidably connected to the first slide base, the first slide base is slidably connected to the second slide base, and the second slide base has a fixed position. A second end of the spindle of the retraction device is connected to the object carriage, and configured to drive the object carriage to retract a predetermined distance relative to the first slide base in the axis direction of the spindle.

DETAILED DESCRIPTION

The embodiments of the present disclosure are described below with reference to the accompanying drawings. It should be noted that terms "up", "down", "left", "right", "front", "rear" and similar expressions used herein are only for the purpose of explanation, and cannot be construed as the limitation of the present disclosure.

The present disclosure relates to a retraction device for a feeding mechanism of a microtome, which includes a spindle that is movable along an axis direction thereof and has a first end; and an operating unit which includes a pull rod and a movable member. The pull rod has a first end and a second end, the movable member defines a step-shaped groove, the first end of the pull rod is connected to the first end of the spindle, the second end of the pull rod is received in the groove. The groove includes a first step, a second step and an inclined face connecting the first step and the second step that are arranged along a first direction, and a height of the second step is greater than a height of the first step in the axis direction of the spindle. The movable member is slidable relative to the pull rod in the first direction, such that the pull rod is switchable between the first step and the second step through the inclined face, and thus the spindle is switchable between a retraction position and a release position. When in the retraction position, the pull rod is received in the second step, and when in the release position, the pull rod is received in the first step.

Figure 1:
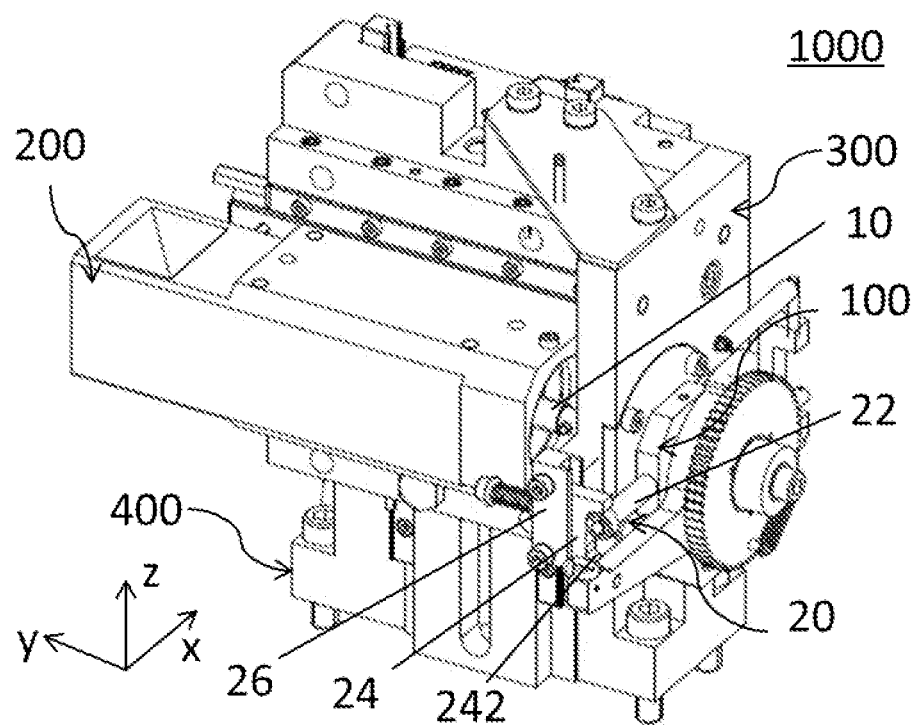
FIG. 1 is a schematic view of a retraction device and a feeding mechanism according to an embodiment of the present disclosure.
Figures 2, 3:
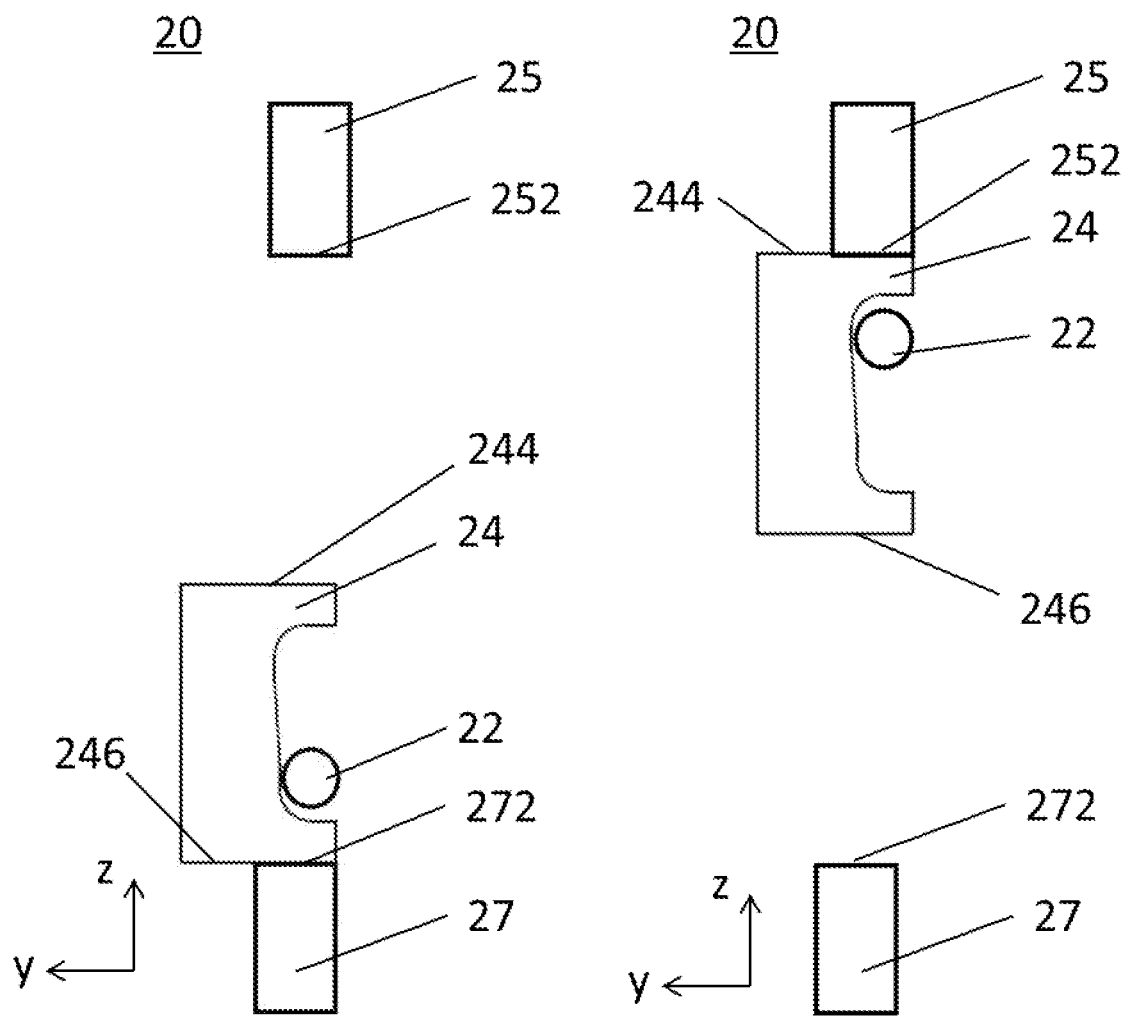
FIG. 2 is a schematic view of an operating unit according to an embodiment of the present disclosure, in which the operating unit is in a retraction position.
FIG. 3 is a schematic view of an operating unit according to an embodiment of the present disclosure, in which the operating unit is in a release position.
Figure 4:
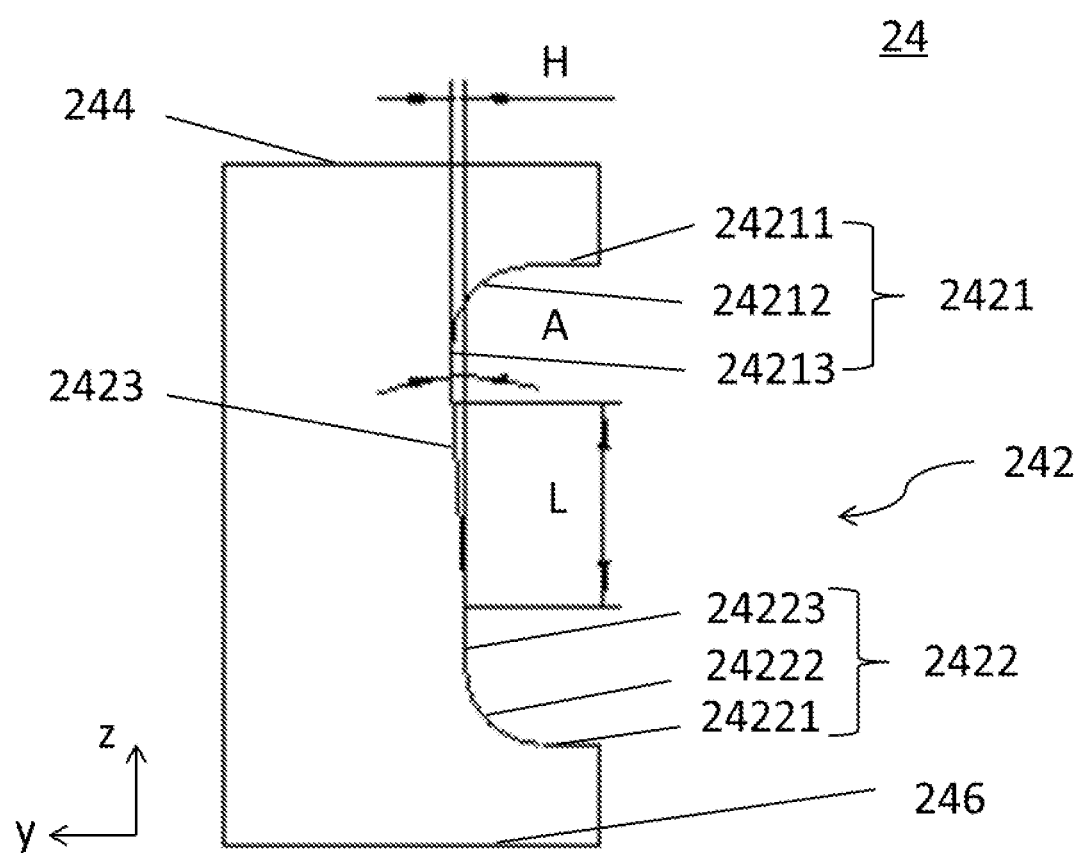
FIG. 4 is a schematic view of a movable member according to an embodiment of the present disclosure.

FIG. 1 illustrates a perspective view of a retraction device and a feeding mechanism according to an embodiment of the present disclosure. FIG. 2 illustrates a schematic view of an operating unit according to an embodiment of the present disclosure, in which the operating unit is in a retraction position. FIG. 3 illustrates a schematic view of an operating unit according to an embodiment of the present disclosure, in which the operating unit is in a release position. FIG. 4 illustrates a schematic view of a movable member according to an embodiment of the present disclosure.

In FIGS. 1-4, in order to facilitate the description and the orientation, an orthogonal XYZ axes are illustrated. A positive direction of X axis is a left direction, while a negative direction of X axis is a right direction; a positive direction of Y axis is a front direction while a negative direction of Y axis is a rear direction; a positive direction of Z axis is an up direction, while a negative direction of Z axis is a down direction.

As illustrated in FIG. 1, a retraction device 100 for a feeding mechanism of a rotary microtome according to the embodiment of the present disclosure includes a spindle 10 and an operating unit 20.

The spindle 10 is movable along an axis direction thereof. The operating unit 20 is configured such that the spindle 10 is switchable between a retraction position and a release position, and the spindle 10 can move a predetermined distance towards or away from the operating unit 20 along an axis direction of the spindle 10 during the switching. In some embodiments, when in the release position, the spindle 10 is in the foremost position, by pulling the spindle 10 through the operating unit 20, the spindle 10 can move a predetermined distance towards the operating unit 20 to the retraction position along the axis direction of the spindle 10. When in the retraction position, the spindle 10 is in the rearmost position, by releasing the spindle 10 through the operating unit 20, the spindle 10 moves away a predetermined distance from the operating unit 20 to the release position along the axis direction of the spindle 10, thereby realizing the retraction and release of the retraction device 100. In some embodiments, the axis direction of the spindle 10 herein refers to a front-and-rear direction illustrated in FIG. 1.

It could be understood by those skilled in the related art that the retraction device 100 may be used to drive the retraction and release of the feeding mechanism 1000 by moving the spindle 10 along the axis direction of the spindle 10.

The operating unit 20 includes a pull rod 22 and a movable member 24. The pull rod 22 is a columnar shape extending along a left-and-right direction, and a first end of the pull rod 22 is connected to a first end of the spindle 10, such that the spindle 10 may be moved along the axis direction of the spindle 10 through the pull rod 22. Further, the pull rod 22 may be connected to the first end of the spindle 10 along a direction perpendicular to the axis direction of the spindle 10, such that the pull rod 22 can move the spindle 10 more lightly. In some embodiments, the first end of the pull rod 22 herein refers to a left end illustrated in FIG. 1, and the first end of the spindle 10 herein refers to a rear end illustrated in FIG. 1.

The movable member 24 defines a step-shaped groove 242, and a second end of the pull rod 22 is received in the groove 242. In some embodiments, the second end of the pull rod 22 herein refers to a right end illustrated in FIG. 1. The groove 242 includes a first step 2421, a second step 2422 and an inclined face 2423 connecting the first step 2421 and the second step 2422 that are arranged along a first direction (the first step 2421, the second step 2422 and the inclined face 2423 are illustrated in FIG. 4), and a height of the second step 2422 is greater than a height of the first step 2421 in the axis direction of the spindle 10. In some embodiments, the first direction herein refers to an up-and-down direction illustrated in FIG. 1, and the first step 2421 is located above the second step 2422. It should be understood that the first direction may not be perpendicular to the axis direction of the spindle 10, but may just intersect with the axis direction of the spindle 10.

The movable member 24 is slidable relative to the pull rod 22 in the first direction, such that the pull rod 22 is switchable between the first step 2421 and the second step 2422 through the inclined face 2423, thereby reducing the noise of the retraction device 100 during operation. In some embodiments, when in the retraction position, the pull rod 22 is received in the second step 2422, and when in the release position, the pull rod 22 is received in the first step 2411.

The retraction device 100 may also include an elastic member (not illustrated) disposed between the spindle 10 and the operating unit 20 with a predetermined pre-load, such that when the spindle 10 is pulled, the spindle 10 compresses the elastic member to move to the retraction position, and when the spindle 10 is released, the spindle 10 moves back to the release position under an elastic restoring force of the elastic member.

The operating unit 20 further includes a sliding groove member 26, the sliding groove member 26 extends in the first direction and is fixedly connected to the pull rod 22, and the movable member 24 is received in the sliding groove member 26, such that the movable member 24 is slidable relative to the sliding groove member 26 and the pull rod 22.

As illustrated in FIG. 2, the operating unit 20 also includes a first end piece 25 and a second end piece 27. The first end piece 25 and the second end piece 27 have fixed positions and are disposed opposite each other in the first direction, and the movable member 24 and the pull rod 22 are disposed between the first end piece 25 and the second end piece 27. It should be noted that the first end piece 25 and the second end piece 27 having fixed positions refer to the first end piece 25 and the second end piece 27 are arranged in a fixed position relative to the pull rod 22 and the movable member 24. In some embodiments, the first end piece 25 is located above the second end piece, and the movable member 24 and the pull rod 22 are movable relative to the first end piece 25 and the second end piece 27 in the up-and-down direction, such that the first end piece 25 and the second end piece 27 define limit positions of movement of the movable member 24 along the up-and-down direction. Thus, the movable member 24 hits the first end piece 25 or the second end piece 27, such that sliding of the movable member 24 relative to the pull rod 22 can be realized, that is, switching of the pull rod 22 between the first step 2421 and the second step 2422 is realized The first end piece 25 and the second end piece 27 may be made of a material with low Shore hardness, such as plastic, rubber, etc. In some embodiments, the first end piece 25 and the second end piece 27 may be made of a material with a Shore hardness of 42 to 70, in some embodiments, a material with a Shore hardness of 50, thereby further reducing the noise of the retraction device 100 during operation.

As illustrated in FIG. 2, when in the retraction position, a lower end face 246 of the movable member 24 abuts against an upper surface 272 of the second end piece 27, and the pull rod 22 is received in the second step 2422.

As illustrated in FIG. 3, when in the release position, an upper end face 244 of the movable member 24 abuts against a lower surface 252 of the first end piece 25, and the pull rod 22 is received in the first step 2421.

As illustrated in FIG. 4, the first step 2421 includes a first flat face 24211, a first arcuate face 24212 and a second flat face 24213. A radius of the first arcuate face 24212 is configured to suitably receive the pull rod 22. In some embodiments, the radius of the first arcuate face 24212 is equal to a radius of the pull rod 22. It should be understood that the radius of the first arcuate face 24212 may also be greater than the radius of the pull rod 22. The first flat face 24211 extends along the axis direction of the spindle 10 and is tangentially connected to the first arcuate face 24212, and the second flat face 24213 extends along the first direction and is tangentially connected to the first arcuate face 24212. It may be understood that the first flat face 24211 is perpendicular to the second flat face 24213. A length of the first flat face 24211 along the axis direction of the spindle 10 and a length of the second flat face 24213 along the first direction are respectively suitable for receiving the pull rod 22 to prevent the pull rod 22 from escaping. In some embodiments, the length of the first flat face 24211 along the axis direction of the spindle 10 and the length of the second flat face 24213 along the first direction are respectively greater than a diameter of the pull rod 22. Further, the length of the first flat face 24211 along the axis direction of the spindle 10 may be equal to the length of the second flat face 24213 in the first direction.

The second step 2422 includes a third flat face 24221, a second arcuate face 24222 and a fourth flat face 24223. A radius of the second arcuate face 24222 is configured to suitably receive the pull rod 22. In some embodiments, the radius of the second arcuate face 24222 is equal to a radius of the pull rod 22. It should be understood that the radius of the second arcuate face 24222 may also be greater than the radius of the pull rod 22. The third flat face 24221 extends along the axis direction of the spindle 10 and is tangentially connected to the second arcuate face 24222, and the fourth flat face 24223 extends along the first direction and is tangentially connected to the second arcuate face 24222. It may be understood that the third flat face 24221 is perpendicular to the fourth flat face 24223. A length of the third flat face 24221 along the axis direction of the spindle 10 and a length of the fourth flat face 24223 along the first direction are respectively suitable for receiving the pull rod 22 to prevent the pull rod 22 from escaping. In some embodiments, the length of the third flat face 24221 along the axis direction of the spindle 10 and the length of the fourth flat face 24223 along the first direction are respectively greater than or equal to the diameter of the pull rod 22. Further, the length of the third flat face 24221 along the axis direction of the spindle 10 is equal to the length of the fourth flat face 24223 in the first direction. It could be understood that the length of the third flat face 24221 along the axis direction of the spindle 10 is shorter than the length of the first flat face 24211 along the axis direction of the spindle 10.

The inclined face 2423 connects a lower edge of the second flat face 24213 and an upper edge of the fourth flat face 24223. An inclined angle A of the inclined face 2423 relative to the first direction ranges from 2° to 5°, and in one embodiment, the inclined angle A is 3.6°. A length of the inclined face 2423 along the axis direction of the spindle 10, i.e. a height difference H between the first step 2421 and the second step 2422 ranges from 0.2 mm to 0.6 mm. In one embodiment, the height difference H is 0.5 mm. Alternatively, the length L of the inclined face 2423 along the first direction ranges from 6 mm to 10 mm, and in one embodiment the length L is 8 mm. Therefore, such arrangement of the inclined face 2433 can further reduce the noise of the retraction device 100 during operation.

Referring to FIGS. 2 and 3, the working process of the retraction device 100 according to embodiments of the disclosure is described as follows.

As illustrated in FIG. 2, the retraction device 100 is in the retraction position, the lower end face 246 of the movable member 24 abuts against the upper surface 272 of the second end piece 27, the pull rod 22 is received in the second step 2422, and the pull rod 22 abuts against the fourth flat face 24223. In order to release the spindle 10, the pull rod 22 may be moved upward. Due to the effect of the elastic member, the pull rod 22 is compressed in the second step 2422, and the movable member 24, the sliding groove member 26 and the pull rod 22 move upward together. When the upper end face 244 of the movable member 24 abuts against the lower surface 252 of the first end piece 25, the movable member 24 cannot move upward any more, and the sliding groove member 26 and the pull rod 22 still move upward together. Due to the effect of the elastic member, the pull rod 22 moves from the second step 2422 to the first step 2421 along the inclined face 2423, and the pull rod 22 moves forward, so as to drive the spindle 10 to move forward for a predetermined distance to return to the release position.

As illustrated in FIG. 3, the retraction device 100 is in the release position, the upper end face 244 of the movable member 24 abuts against the lower surface 252 of the first end piece 25, the pull rod 22 is received in the first step 2421, and the pull rod 22 abuts against the second flat face 24213.

In order to retract the spindle 10, the pull rod 22 may be moved downward. Due to the effect of the elastic member, the pull rod 22 is compressed in the first step 2421, and the movable member 24, the sliding groove member 26 and the pull rod 22 move downward together. When the lower end face 246 of the movable member 24 abuts against the upper surface 272 of the second end piece 27, the movable member 24 cannot move downward any more, and the sliding groove member 26 and the pull rod 22 still move downward together. Due to the effect of the elastic member, the pull rod 22 moves from the first step 2421 to the second step 2422 along the inclined face 2423, and the pull rod 22 moves backward, so as to drive the spindle 10 to move backward for a predetermined distance to return to the retraction position.

Referring to FIG. 1, the feeding mechanism 1000 according to the embodiment of the present disclosure includes an object carriage 200, a first slide base 300, a second slide base 400 and a retraction device 100 according to the above embodiments.

The object carriage 200 is slidably connected to the first slide base 300, the first slide base 300 is slidably connected to the second slide base 400, and the second slide base 400 has a fixed position. The second end of the spindle 10 of the retraction device 100 is connected to the object carriage 200, and configured to drive the object carriage 200 to retract a predetermined distance relative to the first slide base 300 along the axis direction of the spindle 10. In some embodiments, the object carriage 200 is slidable relative to the first slide base 300 along the front-and-rear direction, and the first slide base 300 is slidable relative to the second slide base 400 along the up-and-down direction. It should be noted that the second slide base 400 having a fixed position refers to the second slide base 400 is arranged in a fixed position relative to the first slide base 300, the object carriage 200 and the retraction device 100, so as to be able to support these components.

It could be understood that other structures and principles of the feeding mechanism 1000 are accessible for those skilled in the related art, which will not be repeated herein.

As illustrated in FIGS. 1 to 4, in some embodiments, the retraction device 100 according to the embodiments of the present disclosure includes a spindle 10 that is movable along an axis direction thereof and has a first end; and an operating unit 20 which includes a pull rod 22 and a movable member 24. The pull rod 22 has a first end and a second end, the movable member 24 defines a step-shaped groove 242, the first end of the pull rod 22 is connected to the first end of the spindle 10, the second end of the pull rod 22 is received in the groove 242. The groove 242 includes a first step 2421, a second step 2422 and an inclined face 2423 connecting the first step 2421 and the second step 2422 that are arranged along a first direction, and a height of the second step 2422 is greater than a height of the first step 2421 in the axis direction of the spindle 10. The movable member 24 is slidable relative to the pull rod 22 in the first direction, such that the pull rod 22 is switchable between the first step 2421 and the second step 2422 through the inclined face 2423, and thus the spindle 10 is switchable between a retraction position and a release position. When in the retraction position, the pull rod 22 is received in the second step 2422, and when in the release position, the pull rod 22 is received in the first step 2421.

In the retraction device 100 and the feeding mechanism 1000 according to the embodiments of the present disclosure, the arrangement of the inclined face 2423 connecting the first step 2421 and the second step 2422 effectively avoids the hit between components of the retraction device 100 during the operation, thereby effectively reducing the noise of the retraction device 100 during operation.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, "a plurality of" means two or more than two, unless specified otherwise.

In the present disclosure, unless specified otherwise, terms "mounted", "couple" "connected", "fixed" and the like are used broadly. For example, fixed connections, detachable connections, or integral connections; may also be mechanical or electrical connections or direct connections, or indirect connections via intervening structures; may also be inner communications or interactions of two elements, which can be understood by those skilled in the art according to specific situations.

In the descriptions of the present disclosure, it should be noted that, unless otherwise expressly specified and limited, the first feature "on" or "under" the second feature may be that the first and second features are in direct contact, or that the first and second features are in indirect contact through an intermediate medium. Moreover, the first feature "on", "above" and "on top of" the second feature may be that the first feature is directly above or obliquely above the second feature, or merely be that the first feature has a level higher than the second feature. The first feature "below", "under" and "on bottom of" the second feature may be that the first feature is directly below or obliquely below the second feature, or merely be that the first feature has a level less than the second feature.

Reference throughout this specification to terms "an embodiment," "some embodiments," "an example", "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples. Furthermore, in the case of non-contradiction, those skilled in the art may combine and group the different embodiments or examples described in this specification and the features of the different embodiments or examples.

Although embodiments of the present disclosure have been illustrated and described above, it should be understood that the above embodiments are illustrative and cannot be construed to limit the present disclosure, and that those skilled in the art may change, modify, alternate and vary the above embodiments within the scope of the present disclosure.

What is claimed is:

1. A retraction device for a feeding mechanism of a microtome, comprising:
 a spindle movable along an axis direction thereof and having a first end; and
 an operating unit comprising a pull rod and a movable member, the pull rod having a first end and a second end, the movable member defining a step-shaped groove, the first end of the pull rod being connected to the first end of the spindle, the second end of the pull rod being received in the groove; the groove comprising a first step, a second step and an inclined face connecting the first step and the second step arranged along a first direction, a height of the second step being greater than a height of the first step in the axis direction of the spindle, and the inclined face being an inclined planar face;

wherein the movable member is slidable relative to the pull rod in the first direction, such that the pull rod is switchable between the first step and the second step through the inclined face, and thus the spindle is switchable between a retraction position and a release position; when in the retraction position, the pull rod is received in the second step, and when in the release position, the pull rod is received in the first step.

2. The retraction device according to claim 1, further comprising an elastic member disposed between the spindle and the operating unit with a predetermined pre-load.

3. The retraction device according to claim 1, wherein the operating unit further comprises a sliding groove member, the sliding groove member extends in the first direction and is fixedly connected to the pull rod, and the movable member is received in the sliding groove member.

4. The retraction device according to claim 1, wherein the operating unit further comprises a first end piece and a second end piece, the first end piece and the second end piece have fixed positions and are disposed opposite each other in the first direction, and the movable member and the pull rod are disposed between the first end piece and the second end piece.

5. The retraction device according to claim 4, wherein when in the retraction position, a lower end face of the movable member abuts against an upper surface of the second end piece, when in the release position, an upper end face of the movable member abuts against a lower surface of the first end piece.

6. The retraction device according to claim 4, wherein the first end piece and the second end piece are made of a material with Shore hardness of 42 to 70.

7. The retraction device according to claim 6, wherein the first end piece and the second end piece are made of a material with Shore hardness of 50.

8. The retraction device according to claim 1, wherein an inclined angle of the inclined face relative to the first direction ranges from 2° to 5°.

9. The retraction device according to claim 8, wherein a height difference between the first step and the second step ranges from 0.2 mm to 0.6 mm.

10. The retraction device according to claim 9, wherein the height difference between the first step and the second step is 0.5 mm.

11. The retraction device according to claim 9, wherein the length of the inclined face along the first direction is 8 mm.

12. The retraction device according to claim 8, wherein a length of the inclined face along the first direction ranges from 6 mm to 10 mm.

13. The retraction device according to claim 8, wherein the inclined angle of the inclined face relative to the first direction is 3.6°.

14. The retraction device according to claim 1, wherein the first step comprises a first flat face extending along the axis direction of the spindle, a second flat face extending along the first direction, and a first arcuate face tangentially connected between the first flat face and the second flat face; the second step comprises a third flat face extending along the axis direction of the spindle, a fourth flat face extending along the first direction, and a second arcuate face tangentially connected between the third flat face and the fourth flat face; the inclined face is connected between a lower edge of the second flat face and an upper edge of the fourth flat face; and a length of the third flat face along the axis direction of the spindle is shorter than a length of the first flat face along the axis direction of the spindle.

15. The retraction device according to claim 14, wherein a radius of the first arcuate face and a radius of the second arcuate face are no less than a radius of the pull rod.

16. The retraction device according to claim 15, wherein the radius of the first arcuate face is equal to the radius of the second arcuate face.

17. The retraction device according to claim 14, wherein a length of the second flat face along the first direction is equal to the length of the first flat face along the axis direction of the spindle, and the length of the fourth flat face along the first direction is equal to the length of the third flat face along the axis direction of the spindle.

18. A feeding mechanism for a microtome, comprising:
an object carriage, a first slide base, a second slide base, and a retraction device comprising:
a spindle movable along an axis direction thereof and having a first end; and
an operating unit comprising a pull rod and a movable member, the pull rod having a first end and a second end, the movable member defining a step-shaped groove, the first end of the pull rod being connected to the first end of the spindle, the second end of the pull rod being received in the groove; the groove comprising a first step, a second step and an inclined face connecting the first step and the second step arranged along a first direction, a height of the second step being greater than a height of the first step in the axis direction of the spindle, and the inclined face being an inclined planar face;
wherein the movable member is slidable relative to the pull rod in the first direction, such that the pull rod is switchable between the first step and the second step through the inclined face, and thus the spindle is switchable between a retraction position and a release position; when in the retraction position, the pull rod is received in the second step, and when in the release position, the pull rod is received in the first step,
wherein the object carriage is slidably connected to the first slide base, the first slide base is slidably connected to the second slide base, and the second slide base has a fixed position a second end of the spindle of the retraction device is connected to the object carriage, and configured to drive the object carriage to retract a predetermined distance relative to the first slide base in the axis direction of the spindle.

19. The feeding mechanism according to claim 18, wherein the object carriage is slidable relative to the first slide base along the axis direction of the spindle, and the first slide base is slidable relative to the second slide base along the first direction.

20. A retraction device for a feeding mechanism of a microtome, comprising:
a spindle movable along an axis direction thereof; and
an operating unit comprising:
a movable member defining a step-shaped groove, the groove comprising a first step, a second step arranged along a first direction and an inclined face connecting the first step and the second step along the first direction, the second step having a depth deeper than a depth of the first step in the axis direction of the spindle, and the inclined face being an inclined planar face; and a pull rod having a first end connected to the spindle and a second end received in the groove, wherein the first direction is perpendicular to the axis direction of the spindle, the pull rod is slidable between the first step and the second step through the inclined face to cause the spindle to switch between a retraction position in which the pull rod is received in the second step, and a release position in which the pull rod is received in the first step.

\* \* \* \* \*